(12) United States Patent
Ames

(10) Patent No.: X6448
(45) Date of Patent: Apr. 6, 1831

(54) RAGS, WASHING

(76) Inventor: John Ames

John Ames
Letters Patent Dated April 6. 1831.

---

The Schedule referred to in these Letters Patent and making part of the same, containing a description in the words of the said John Ames himself of his improvement in the method of "washing rags for the manufacture of Paper"

---

Know all men by these presents, that I John Ames of Springfield in the County of Hampden and Commonwealth of Massachusetts, Gentleman, have invented, constructed, made and applied to use, a new and useful improvement in the mode or method of Washing rags and in the manufacture of paper, by machinery set forth and specified in the words following viz, The improvement consists in dispensing with the washers or screens now in use and substituting in their stead, a wire cloth cylinder for carrying off the dirt and filth which may be beaten from the rags or held in solution by the water, without the waste and delay of the old mode. The cylinder used by me is about twenty two inches in length and twenty two inches in diameter, hollow, closed at one end, open at the other, surrounded by two Coats or coverings of wire cloth, and revolves upon an axis. I construct the cylinder as follows. the frame consists of Metalic rods of suitable length, and sufficient in number to give strength and form to the cylinder, running parallel with the axis and supported by arms of the same metal, Over these rod is first stretched a coarse wire cloth and then over that is stretched another wire cloth of finer texture; any
reticulated material however will do for the inner
covering as its principal object and use is to support the
outer one without opposing any considerable obstacle
to the free passage of the water into the cylinder. The cyl-
inder is left open at one end but is entirely closed by
a metal disk at the other.

Thus constructed it is fixed in the washing vats
or Engine, resting on arbors with the open end adjusted
to the side of the Engine or vat so closely as to prevent
a waste of the stock, and placed at a convenient height
to allow a free passage of the rags around the engine.

Within the circle described by the periphery of the
open end of the cylinder upon the side of the Engine,
an orifice is made to let off the water which percolates
into the cylinder. A band or gearing connected with
other parts of the machinery communicates a rotary
motion upon its axis, to the cylinder corresponding with
the current, or roll of the stuff around in the engine.

The benefit and utility of this improvement consists,
1st in the saving of time in preparing the rags for
manufacture. 2d in dispensing with the washers
now in use; and 3d in preventing a waste of stock.
which in the ordinary mode of cleaning is very
considerable. By my improved mode the dirty water
is made to pass off more rapidly, and of course the
clean water can be admitted more freely, than
when washers are used through the apertures of
which, the pulp is driven by the force of the roll
or motion of the water and so wasted, or clogs the wash-
ers by filling up the apertures and prevents the
passing of the dirty water. By the rotary motion

United States Patent

Patent No.: X6448 of the cylinder by my mode coinciding with the role of the stuff the water is freely received into the cylinder and passed off.

The improvement which I claim specifically as mine is the process or method of washing or cleaning rags by adapting the wire cloth cylinder to the common washing engine divested of its washers, to effect the object before mentioned.

The wire cloth cylinder I do not claim as my invention for which I now seek a patent, it having been before patented by me.

In testimony that the above is a true specification of my said improvement as above described I have hereto set my hand & seal the twelfth day of March in the year of our Lord eighteen hundred and thirty one.

Witnesses
John Ames (L.S.)

Sylvanus Stebbins
William Bliss (Received and Recorded anew February 17. 1844.)

(725 words)

Exd
JJR